United States Patent
Pichler et al.

(10) Patent No.: US 11,593,603 B2
(45) Date of Patent: Feb. 28, 2023

(54) RECTIFIER CIRCUITS AND CORRESPONDING METHODS FOR RFID DEVICES

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 17/451,886

(22) Filed: Oct. 22, 2021

(65) Prior Publication Data

US 2022/0164618 A1 May 26, 2022

(30) Foreign Application Priority Data

Nov. 20, 2020 (EP) .................................... 20208784

(51) Int. Cl.
  *G06K 19/07* (2006.01)
  *H02M 3/07* (2006.01)
  *G06K 19/077* (2006.01)

(52) U.S. Cl.
  CPC ..... *G06K 19/0713* (2013.01); *G06K 19/0723* (2013.01); *G06K 19/07773* (2013.01); *H02M 3/075* (2021.05)

(58) Field of Classification Search
  CPC ........... G06K 19/0713; G06K 19/0723; G06K 19/07773; H02M 3/073; H02M 3/075
  USPC .................................................. 327/104, 536
  See application file for complete search history.

(56) References Cited

U.S. PATENT DOCUMENTS

| | | | |
|---|---|---|---|
| 6,278,315 B1* | 8/2001 | Kim ........................ | G11C 5/145 327/541 |
| 6,476,666 B1* | 11/2002 | Palusa ................... | H02M 3/073 327/390 |
| 7,023,260 B2 | 4/2006 | Thorp et al. | |
| 7,256,640 B2 | 8/2007 | Ucciardello et al. | |
| 7,944,279 B1 | 5/2011 | El Waffaoui | |
| 8,699,247 B2 | 4/2014 | Nguyen et al. | |
| 8,860,500 B2* | 10/2014 | Sheng ........................ | G05F 3/02 327/536 |
| 10,312,791 B1* | 6/2019 | Ker ................... | H03K 3/356113 |
| 11,270,177 B2* | 3/2022 | Pichler ............... | G06K 19/0713 |
| 2003/0214346 A1* | 11/2003 | Pelliconi ............... | H02M 3/073 327/536 |
| 2005/0093614 A1* | 5/2005 | Lee ........................ | H02M 3/073 327/536 |
| 2013/0299593 A1 | 11/2013 | Glidden, III | |

* cited by examiner

FOREIGN PATENT DOCUMENTS

EP 2031546 A2 3/2009

*Primary Examiner* — William Hernandez

(57) ABSTRACT

There is described a rectifier circuit for providing and limiting a supply voltage to an RFID tag, the circuit including a pair of antenna input terminals configured to receive an input signal from an RFID tag antenna. A plurality of charge pump stages are coupled in cascade in such a way that an input terminal of a first charge pump stage in the cascade is connected to ground and an input terminal of each subsequent charge pump stage in the cascade is coupled to an output terminal of the preceding charge pump stage in the cascade. A control logic is configured to select the output terminal of one charge pump stage among the plurality of charge pump stages to provide the supply voltage. Furthermore, an RFID tag and a method of providing and limiting a supply voltage to an RFID tag are described.

19 Claims, 2 Drawing Sheets

RECTIFIER CIRCUITS AND CORRESPONDING METHODS FOR RFID DEVICES

CROSS-REFERENCE TO RELATED APPLICATIONS

This application claims priority under 35 U.S.C. § 119 to European Patent Application No. 20208784.7, filed on Nov. 20, 2020, the contents of which are incorporated by reference herein.

TECHNICAL FIELD

The present disclosure relates to the field of RF communication devices. More specifically, the present disclosure relates to rectifier circuits and methods for providing and limiting a supply voltage to an RFID tag. Furthermore, the present disclosure relates to an RFID tag comprising a corresponding rectifier circuit.

ART BACKGROUND

State of the art passive UHF RFID tags use a charge pump for generating the main power supply, i.e. by converting the AC voltage from the antenna into a DC supply voltage. The output voltage of this rectifier is strongly dependent on input power and impedance matching. To prevent physical damage to the electronic components in RFID tags, state of the art implementations utilize a charge pump limiter that clamps the output voltage of the rectifier to a certain level. However, this approach causes the tag impedance to change and thus has a strong de-tuning effect which may lead to significant reductions in the return link performance, i.e. a reduced strength of the signal received by the reader device.

There may thus be a need for a way of providing a rectifier circuit that has efficient voltage limitation but without the aforementioned drawbacks.

SUMMARY

This need may be met by the subject matter according to the independent claims. Advantageous embodiments of the present disclosure are set forth in the dependent claims.

According to a first aspect, there is provided a rectifier circuit for providing and limiting a supply voltage to an RFID tag, the circuit comprising a pair of antenna input terminals configured to receive an input signal from an RFID tag antenna; a plurality of charge pumps stages, each charge pump stage comprising a pair of charging terminals connected to the pair of antenna input terminals, an input terminal, and an output terminal, wherein the plurality of charge pump stages are coupled in cascade in such a way that the input terminal of a first charge pump stage in the cascade is connected to ground and the input terminal of each subsequent charge pump stage in the cascade is coupled to the output terminal of the preceding charge pump stage in the cascade; and a control logic configured to select the output terminal of one charge pump stage among the plurality of charge pump stages to provide the supply voltage.

This aspect is based on the idea that the desired supply voltage is selectively taken from an output terminal of one of a plurality of charge pump stages coupled in a cascade-like manner. Each single charge pump stage in the cascade is connected to the antenna input (to be charged by an input signal received from an RFID antenna) such that the cascade of charge pump stages presents a constant impedance independent of which particular charge pump stage is selected for providing the supply voltage at a given time. Hence, the power supply circuit is capable of providing a desired and limited supply voltage while maintaining an essentially constant impedance. As the charge pump stages are coupled in cascade, none of the individual charge pump stages is exposed to the total supply voltage. In other words, the charge pump stages are floating. Due to the constant impedance of the circuit, decoupling effects can be avoided, and a correspondingly efficient return link performance is assured.

According to an embodiment, each of the plurality of charge pump stages is configured to provide a predetermined voltage difference between its respective output terminal and input terminal.

In other words, the voltage difference between output and input terminal of any charge pump stage in the cascade is essentially the same. Thus, if the predetermined voltage difference is positive, e.g. 0.2 V, then the voltage at the output terminal of the fifth charge pump stage in the cascade (where the first charge pump stage in the cascade has its input terminal connected to ground) will be equal to 1.0 V. Similarly, if the voltage difference is negative, e.g. −0.2 V, then the voltage at the output terminal of the fifth charge pump stage in the cascade will be equal to −1.0 V. The predetermined voltage difference is dependent on the power of the received input signal.

According to a further embodiment, the control logic is configured to select the output terminal of the charge pump among the plurality of charge pump stages at which output terminal the voltage is closest to and not above an upper threshold voltage.

In other words, the control logic selects the charge pump output terminal that has voltage as close as possible to the upper threshold voltage without exceeding said upper threshold voltage.

According to a further embodiment, the control logic is configured to initially select the output terminal of the last charge pump in the cascade, compare the voltage at the initially selected output terminal with an upper threshold voltage, and if said voltage exceeds the upper threshold voltage, select the output terminal of the one of the preceding charge pumps in the cascade, at which output terminal the voltage is closest to and not above said upper threshold voltage.

In this embodiment, the control logic starts with the output terminal of the last charge pump in the cascade, i.e. the highest voltage available, and compares this voltage with the upper threshold voltage. The comparison may be done utilizing a comparator circuit. If the corresponding voltage exceeds the upper threshold voltage, the control logic moves backwards through the cascade of charge pump stages until an output terminal is found that has a voltage below or equal to the upper threshold voltage.

According to a further embodiment, the control logic comprises a plurality of controllable switches, each switch being arranged between the output terminal of one of the plurality of charge pump stages and a rectifier output terminal.

According to a further embodiment, the control logic is configured to close and open the plurality of switches such that the selected output terminal is connected to the rectifier output terminal.

According to a further embodiment, the pair of antenna input terminals comprises a positive input terminal and a negative input terminal, the pair of charging terminals of each charge pump stage comprises a positive charging terminal and a negative charging terminal, and for any two neighboring charge pump stages in the cascade, the positive charging terminal of one of the two neighboring charge pump stages is connected to the positive input terminal, the positive charging terminal of the other one of the two neighboring charge pump stages is connected to the negative input terminal, the negative charging terminal of the one of the two neighboring charge pumps is connected to the negative input terminal, and the negative charging terminal of the other one of the two neighboring charge pump stages is connected to the positive input terminal.

In other words, the charge pumps in the cascade are arranged with alternating polarity of the charge terminals relative to the antenna input terminals such that neighboring charge pump stages receive alternating phases at their respective charging terminals. Thereby, efficient charging can be achieved for input signals with high frequency.

According to a second aspect, there is provided an RFID tag comprising an RFID tag antenna, an RFID tag processing circuit, and a rectifier circuit configured to provide and limit a supply voltage to the RFID tag processing circuit. The rectifier circuit comprises a pair of antenna input terminals coupled to receive an input signal from the RFID tag antenna, a plurality of charge pump stages, each charge pump stage comprising a pair of charging terminals connected to the pair of antenna input terminals, an input terminal, and an output terminal, wherein the plurality of charge pump stages are coupled in cascade in such a way that the input terminal of a first charge pump stage in the cascade is connected to ground and the input terminal of each subsequent charge pump stage in the cascade is coupled to the output terminal of the preceding charge pump stage in the cascade, and a control logic configured to select the output terminal of one charge pump stage among the plurality of charge pump stages to provide the supply voltage.

This aspect is essentially based on the same idea as the first aspect discussed above and provides an RFID tag utilizing the rectifier circuit according to the first aspect. Hence, the supply voltage for the RFID tag processing circuit is selectively taken from an output terminal of one of a plurality of charge pump stages coupled in a cascade-like manner. Each single charge pump stage in the cascade is connected to the antenna input (to be charged by an input signal received from the RFID antenna) such that the cascade of charge pumps presents a constant impedance independent of which particular charge pump stage is selected for providing the supply voltage at a given time. Hence, the power supply circuit is capable of providing a suitable and limited supply voltage while maintaining an essentially constant input impedance. As the charge pump stages are coupled in cascade, none of the individual charge pump stages is exposed to the total supply voltage. In other words, the charge pump stages are floating. Due to the constant input impedance of the circuit, decoupling effects can be avoided, and a correspondingly efficient return link performance is assured.

According to a further embodiment, each of the plurality of charge pump stages are configured to provide a predetermined voltage difference between its respective output terminal and input terminal.

In other words, the voltage difference between output and input terminal of any charge pump in the cascade is essentially the same. Thus, if the predetermined voltage difference is positive, e.g. 0.2 V, then the voltage at the output terminal of the fifth charge pump stage in the cascade (where the first charge pump stage in the cascade has its input terminal connected to ground) will be equal to 1.0 V. Similarly, if the voltage difference is negative, e.g. −0.2 V, then the voltage at the output terminal of the fifth charge pump stage in the cascade will be equal to −1.0 V. The predetermined voltage difference is dependent on the power of the received input signal.

According to a further embodiment, the control logic is configured to select the output terminal of the charge pump stage among the plurality of charge pump stages at which output terminal the voltage is closest to and not above an upper threshold voltage.

In other words, the control logic selects the charge pump stage output terminal that has voltage as close as possible to the upper threshold voltage without exceeding said upper threshold voltage.

According to a further embodiment, the control logic is configured to initially select the output terminal of the last charge pump stage in the cascade, compare the voltage at the initially selected output terminal with an upper threshold voltage, and if said voltage exceeds the upper threshold voltage, select the output terminal of the one of the preceding charge pump stages in the cascade, at which output terminal the voltage is closest to and not above said upper threshold voltage.

In this embodiment, the control logic starts with the output terminal of the last charge pump stage in the cascade, i.e. the highest voltage available, and compares this voltage with the upper threshold voltage. The comparison may be done utilizing a comparator circuit. If the corresponding voltage exceeds the upper threshold voltage, the control logic moves backwards through the cascade of charge pump stages until an output terminal is found that has a voltage below or equal to the upper threshold voltage.

According to a further embodiment, the control logic comprises a plurality of controllable switches, each switch being arranged between the output terminal of one of the plurality of charge pump stages and a rectifier output terminal.

According to a further embodiment, the control logic is configured to close and open the plurality of switches such that the selected output terminal is connected to the rectifier output terminal.

According to a further embodiment, the pair of antenna input terminals comprises a positive input terminal and a negative input terminal, the pair of charging terminals of each charge pump stage comprises a positive charging terminal and a negative charging terminal, and for any two neighboring charge pump stages in the cascade, the positive charging terminal of one of the two neighboring charge pump stages are connected to the positive input terminal, the positive charging terminal of the other one of the two neighboring charge pump stages are connected to the negative input terminal, the negative charging terminal of the one of the two neighboring charge pump stages are connected to the negative input terminal, and the negative charging terminal of the other one of the two neighboring charge pump stages are connected to the positive input terminal.

In other words, the charge pump stages in the cascade are arranged with alternating polarity of the charge terminals relative to the antenna input terminals. Thereby, efficient charging can be achieved for input signals with high frequency.

According to a third aspect, there is provided a method of providing and limiting a supply voltage to an RFID tag, the method comprising providing a pair of antenna input terminals configured to receive an input signal from an RFID tag antenna, providing a plurality of charge pump stages, each charge pump stage comprising a pair of charging terminals connected to the pair of antenna input terminals, an input terminal, and an output terminal, wherein the plurality of charge pump stages are coupled in cascade in such a way that the input terminal of a first charge pump stage in the cascade is connected to ground and the input terminal of each subsequent charge pump stage in the cascade is coupled to the output terminal of the preceding charge pump stage in the cascade, and selecting the output terminal of one charge pump stage among the plurality of charge pump stages to provide the supply voltage.

This aspect is essentially based on the same idea as the first and second aspects described above and provides a corresponding method of providing a supply voltage to an RFID tag according to which the supply voltage for the RFID tag is selectively taken from an output terminal of one of a plurality of charge pump stages coupled in a cascade-like manner. Each single charge pump stage in the cascade is connected to the antenna input (to be charged by an input signal received from the RFID antenna) such that the cascade of charge pump stages presents a constant impedance independent of which particular charge pump stage is selected for providing the supply voltage at a given time. Hence, a suitable and limited supply voltage can be provided while maintaining an essentially constant impedance. As the charge pump stages are coupled in cascade, none of the individual charge pump stages is exposed to the total supply voltage. In other words, the charge pump stages are floating. Due to the constant input impedance of the circuit, decoupling effects can be avoided, and a correspondingly efficient return link performance is assured.

According to a further embodiment, the selecting step comprises selecting the output terminal of the charge pump stage among the plurality of charge pump stages at which output terminal the voltage is closest to and not above an upper threshold voltage.

In other words, the charge pump stage output terminal that has voltage as close as possible to the upper threshold voltage without exceeding said upper threshold voltage is selected.

According to a further embodiment, the selecting step comprises initially selecting the output terminal of the last charge pump stage in the cascade, comparing the voltage at the initially selected output terminal with an upper threshold voltage, and if said voltage exceeds the upper threshold voltage, selecting the output terminal of the one of the preceding charge pump stages in the cascade, at which output terminal the voltage is closest to and not above said upper threshold voltage.

In this embodiment, the selection step starts with the output terminal of the last charge pump stage in the cascade, i.e. the highest voltage available, and compares this voltage with the upper threshold voltage. If the corresponding voltage exceeds the upper threshold voltage, the selection process moves backwards through the cascade of charge pump stages until an output terminal is found that has a voltage below or equal to the upper threshold voltage.

According to a further embodiment, the selecting step comprises operating a plurality of controllable switches, each switch being arranged between the output terminal of one of the plurality of charge pump stages and a rectifier output terminal.

According to a further embodiment, the selecting step comprises closing and opening the plurality of switches such that the selected output terminal is connected to the rectifier output terminal.

It should be noted that exemplary embodiments have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

Figure 1:
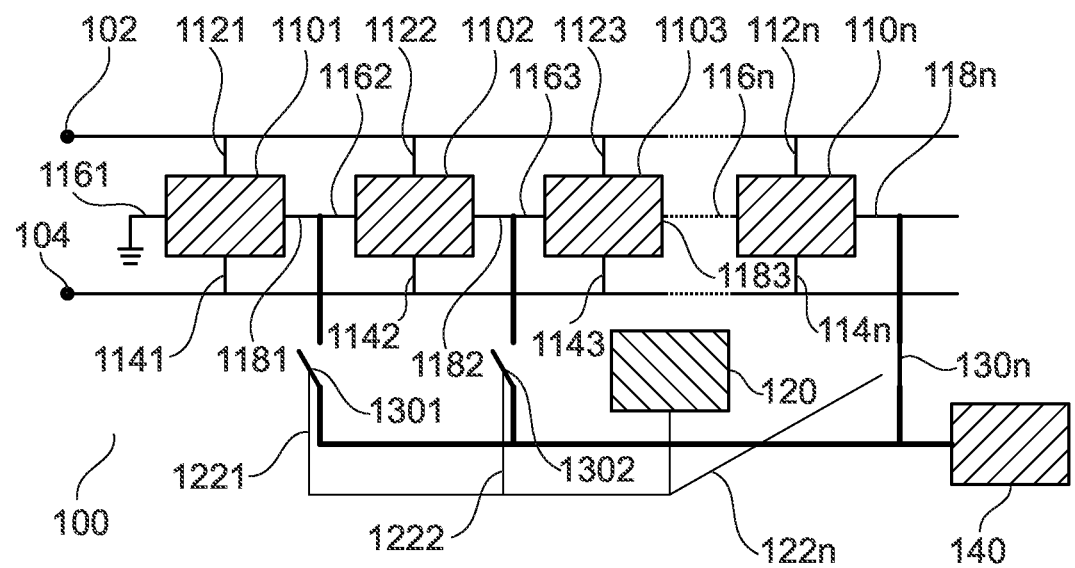
FIG. 1 shows a block diagram of a rectifier circuit for an RFID tag according to an embodiment.

The illustration in the drawing is schematic. It is noted that in different figures, similar or identical elements are provided with the same reference signs or with reference signs, which differ only within the first digit.

FIG. 1 shows a block diagram of a rectifier circuit 100 for an RFID tag according to an embodiment. The rectifier circuit 100 comprises a pair of antenna input terminals 102, 104 configured to receive an input signal from an RFID tag antenna (not shown), a plurality of charge pump stages 1101, 1102, 1103, 110$n$ coupled in cascade, and a control logic 120.

Each of the charge pump stages 1101, 1102, 1103, 110$n$ comprises a pair of charging terminals connected to the pair of antenna input terminals 102, 104, an input terminal, and an output terminal. More specifically, charge pump stage 1101 comprises charging terminal 1121 connected to antenna input terminal 102, charging terminal 1141 connected to antenna input terminal 104, input terminal 1161, and output terminal 1181. Charge pump stage 1102 comprises charging terminal 1122 connected to antenna input terminal 102, charging terminal 1142 connected to antenna input terminal 104, input terminal 1162, and output terminal 1182. Charge pump stage 1103 comprises charging terminal 1123 connected to antenna input terminal 102, charging terminal 1143 connected to antenna input terminal 104, input terminal 1163, and output terminal 1183. Charge pump stage 110$n$ comprises charging terminal 112$n$ connected to antenna input terminal 102, charging terminal 114$n$ connected to antenna input terminal 104, input terminal 116$n$, and output terminal 118$n$.

The charge pump stages 1101, 1102, 1103, 110$n$ are coupled in cascade in such a way that the input terminal 1161 of the first charge pump stage 1101 in the cascade is connected to ground and the input terminal of each subsequent charge pump stage in the cascade is coupled to the output terminal of the preceding charge pump stage in the cascade. More specifically, the input terminal 1162 of the second charge pump stage 1102 is connected to the output terminal 1181 of the first charge pump stage 1101, the input terminal 1163 of the third charge pump stage 1103 is connected to the output terminal 1182 of the second charge pump stage 1102, and the input terminal 116n of the last (nth) charge pump stage 110n in the cascade is connected to the output terminal of the next-to-last charge pump stage (not shown). Hence, all charge pump stages 1101, 1102, 1103, 110n in the cascade have their respective charging terminals connected to the antenna input terminals 102, 104 and only "see" the voltage difference between their respective output and input terminals. This voltage difference is preferably the same (or close to being the same) across each charge pump stage in the cascade, such that the output voltage increments with essentially the same amount for each charge pump stage in the cascade. The cascade of charge pump stages 1101, 1102, 1103, 110n is also referred to as a cascade of floating charge pump stages.

The power supply circuit further comprises a control logic 120 configured to select the output terminal 1181, 1182, 1183, 118n of one of the charge pump stages 1101, 1102, 1103, 110n to provide the supply voltage 140 for the RFID tag circuitry (not shown). In this embodiment, the selection is done by providing control signals 1221, 1222, 1223, 122n from the control logic 120 to each of a plurality of switches 1301, 1302, 130n in order to close a connection between the rectifier output terminal 140 and a single one of the charge pump stage output terminals, such as output terminal 118n of the last charge pump stage 110n in the cascade. The selection of the particular output terminal may involve comparing (e.g. utilizing a comparator circuit) the corresponding voltage to an upper threshold voltage and, if necessary, stepping back through the cascade until an output voltage is found that does not exceed the upper threshold voltage. Once the proper charge pump stage output terminal is found, the corresponding supply voltage 140 is provided to the RFID tag circuitry which can then send its response to the reader device from which the input signal originated. For the rare and unlikely case, that the voltage at the output terminal 1181 of the first charge pump stage is above the threshold, the rectifier circuit may comprise a conventional voltage limiter (not shown) to make sure that the rectifier output voltage is below the upper threshold voltage. Only if this limiter is activated, the circuit impedance will change and corresponding detuning and reduction in return link performance may occur.

Figure 2:
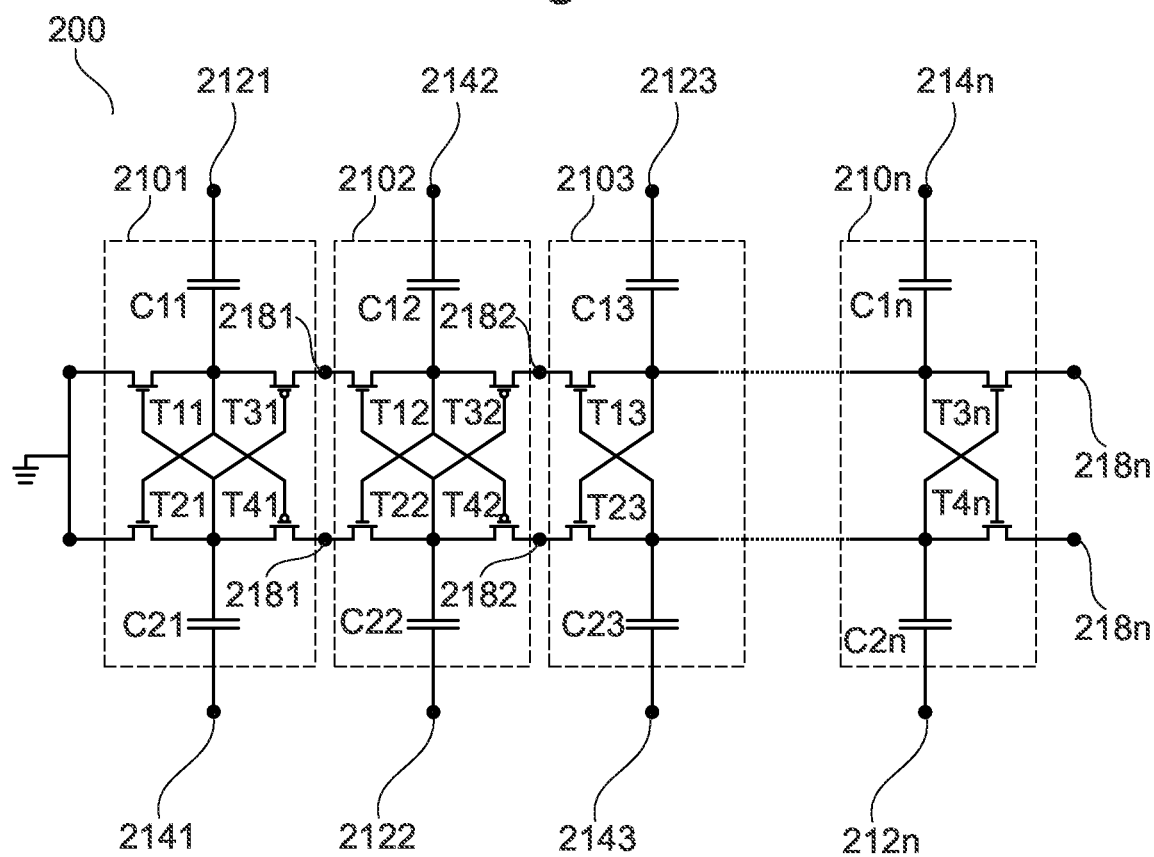
FIG. 2 shows a circuit diagram of a rectifier circuit for an RFID tag according to an embodiment.

FIG. 2 shows a circuit diagram of a rectifier circuit 200 for an RFID tag according to an embodiment. The overall structure of rectifier circuit 200 is similar to the circuit 100 shown in FIG. 1 and discussed above. More specifically, the circuit 200 comprises a cascade of charge pump stages 2101, 2102, 2103, 210n, each comprising two capacitors and four transistors. More specifically, the first charge pump stage 2101 comprises capacitors C11, C21, NMOS transistors T11, T21, and PMOS transistors T31, T41. Similarly, the second charge pump stage 2102 comprises capacitors C12, C22, NMOS transistors T12, T22, and PMOS transistors T32, T42, while the third charge pump stage 2103 comprises capacitors C13, C23, NMOS transistors T13, T23, and PMOS transistors T33, T43 (not shown). Finally, the last (n-th) charge pump stage 210n comprises capacitors C1n, C2n, NMOS transistors T1n, T2n (not shown), and PMOS transistors T3n, T4n. Preferably, all capacitors have the same capacitance, and the corresponding transistors in the charge pump stages are identical. Referring to the first charge pump stage 2101 as an example, the first capacitor C11 is coupled between the first charging terminal 2121 and the gates of transistors T21 and T41, while the second capacitor C21 is coupled between the second charging terminal 2141 and the gates of transistors T11 and T31.

The first charge pump stage 2101 comprises a first charging terminal 2121 and a second charging terminal 2141, the second charge pump stage 2102 comprises a first charging terminal 2122 and a second charging terminal 2142, the third charge pump stage 2103 comprises a first charging terminal 2123 and a second charging terminal 2143, and the n-th charge pump stage 210n comprises a first charging terminal 212n and a second charging terminal 214n. As can be seen in FIG. 2, the first charging terminals 2121, 2123 of the first and third charge pump stages 2101, 2103 (and other charge pump stages located in an uneven numbered position in the cascade) are located in the upper part of the circuit, while the first charging terminal 2122 of the second charge pump stage 2102 (and other charge pump stages located in an even numbered position in the cascade) are located in the lower part of the circuit. Similarly, the second charging terminals 2141, 2143 of the first and third charge pump stages 2101, 2103 (and other charge pump stages located in an uneven numbered position in the cascade) are located in the lower part of the circuit, while the second charging terminal 2122 of the second charge pump stage 2102 (and other charge pump stages located in an even numbered position in the cascade) are located in the upper part of the circuit. Hence, since the first charging terminals are all connected to one of the input terminals (not shown) while all second charging terminals are connected to the other one of the input terminals (not shown), neighboring charge pump stages are operating essentially 180° out of phase.

The first charge pump stage 2101 comprises output terminals 2181, the second charge pump stage 2102 comprises output terminals 2182, and the last charge pump stage 210n comprises output terminals 218n. Control logic and switches (not shown) similar to the arrangement shown in FIG. 1 and discussed above are configured to select and connect the output terminals 2181, 2182, . . . 218n of one of the charge pump stages in the cascade to provide the corresponding supply voltage to the RFID tag circuitry as previously discussed.

Figure 3:
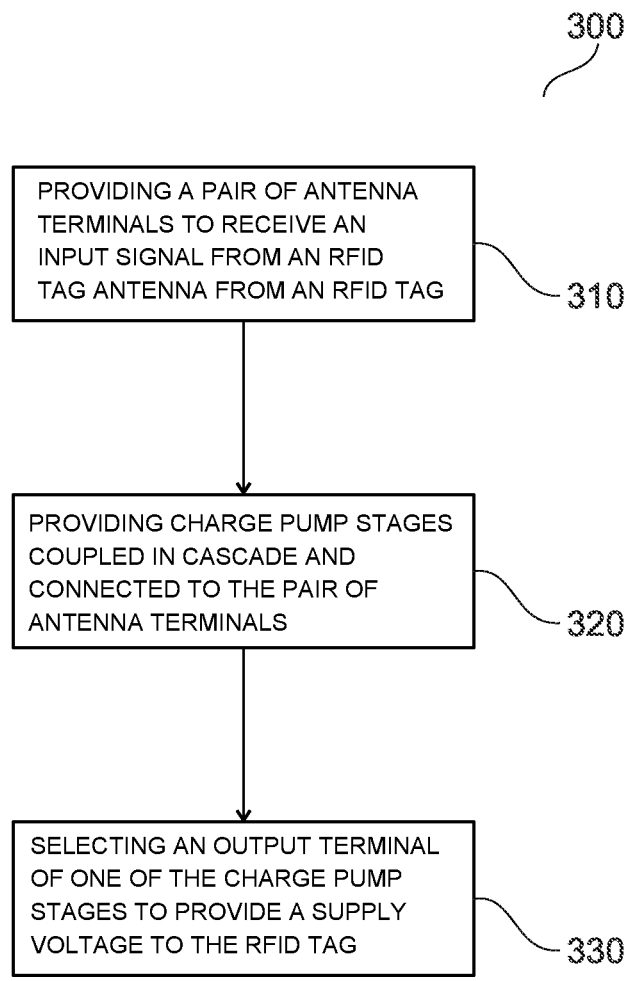
FIG. 3 shows a flowchart of a method of providing and limiting a supply voltage to an RFID tag in accordance with an embodiment.

FIG. 3 shows a flowchart of a method 300 of providing a supply voltage to an RFID tag in accordance with an embodiment.

The method 300 begins at 310 by providing a pair of antenna input terminals configured to receive an input signal from an RFID tag antenna.

Then, at 320, a plurality of charge pump stages is provided. Each charge pump stage comprises a pair of charging terminals connected to the pair of antenna input terminals, an input terminal, and an output terminal. The plurality of charge pump stages are coupled in cascade in such a way that the input terminal of a first charge pump stage in the cascade is connected to ground and the input terminal of each subsequent charge pump stage in the cascade is coupled to the output terminal of the preceding charge pump stage in the cascade. The cascade of charge pump stages is formed to have a certain and essentially constant impedance in order to optimize matching and tuning.

At 330, the output terminal of one charge pump stage among the plurality of charge pump stages is selected to provide the supply voltage.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

The invention claimed is:

1. A rectifier circuit for providing and limiting a supply voltage to an RFID tag, the circuit comprising:
   a pair of antenna input terminals configured to receive an input signal from an RFID tag antenna;
   a plurality of charge pump stages, each charge pump stage comprising a pair of charging terminals connected to the pair of antenna input terminals, an input terminal, and an output terminal, wherein the plurality of charge pump stages are coupled in cascade in such a way that the input terminal of a first charge pump stage in the cascade is connected to ground and the input terminal of each subsequent charge pump stage in the cascade is coupled to the output terminal of the preceding charge pump stage in the cascade; and
   a control logic configured to select the output terminal of one charge pump stage among the plurality of charge pump stages to provide the supply voltage.

2. The rectifier circuit according to claim 1, wherein each of the plurality of charge pump stages is configured to provide a predetermined voltage difference between its respective output terminal and input terminal.

3. The rectifier circuit according to claim 1, wherein the control logic is configured to select the output terminal of the charge pump stage among the plurality of charge pump stages at which output terminal the voltage is closest to and not above an upper threshold voltage.

4. The rectifier circuit according to claim 1, wherein the control logic is configured to initially select the output terminal of the last charge pump stage in the cascade, compare the voltage at the initially selected output terminal with an upper threshold voltage, and if said voltage exceeds the upper threshold voltage, select the output terminal of one of the preceding charge pump stages in the cascade, at which the output terminal voltage is closest to and not above said upper threshold voltage.

5. The rectifier circuit according to claim 1, wherein the control logic comprises a plurality of switches, each switch being arranged between the output terminal of one of the plurality of charge pump stages and a rectifier output terminal.

6. The rectifier circuit according to claim 5, wherein the control logic is configured to close and open the plurality of switches such that the selected output terminal is connected to the rectifier output terminal.

7. The rectifier circuit according to claim 1, wherein
   the pair of antenna input terminals comprises a positive input terminal and a negative input terminal,
   the pair of charging terminals of each charge pump stage comprises a positive charging terminal and a negative charging terminal, and
   for any two neighboring charge pump stages in the cascade, the positive charging terminal of one of the two neighboring charge pump stage is connected to the positive input terminal, the positive charging terminal of the other one of the two neighboring charge pump stage is connected to the negative input terminal, the negative charging terminal of the one of the two neighboring charge pump stages is connected to the negative input terminal, and the negative charging terminal of the other one of the two neighboring charge pump stages is connected to the positive input terminal.

8. An RFID tag comprising:
   an RFID tag antenna;
   an RFID tag processing circuit; and
   a rectifier circuit configured to provide and limit a supply voltage to the RFID tag processing circuit,
   wherein the rectifier circuit comprises:
   a pair of antenna input terminals coupled to receive an input signal from the RFID tag antenna;
   a plurality of charge pump stages, each charge pump stage comprising a pair of charging terminals connected to the pair of antenna input terminals, an input terminal, and an output terminal, wherein the plurality of charge pump stages are coupled in cascade in such a way that the input terminal of a first charge pump stage in the cascade is connected to ground and the input terminal of each subsequent charge pump stage in the cascade is coupled to the output terminal of the preceding charge pump stage in the cascade; and
   a control logic configured to select the output terminal of one charge pump stage among the plurality of charge pump stages to provide the supply voltage.

9. The RFID tag according to claim 8, wherein each of the plurality of charge pump stages is configured to provide a predetermined voltage difference between its respective output terminal and input terminal.

10. The RFID tag according to claim 8, wherein the control logic is configured to select the output terminal of the charge pump stage among the plurality of charge pump stages at which the output terminal voltage is closest to and not above an upper threshold voltage.

11. The RFID tag according to claim 8, wherein the control logic is configured to initially select the output terminal of the last charge pump stage in the cascade, compare the voltage at the initially selected output terminal with an upper threshold voltage, and if said voltage exceeds the upper threshold voltage, select the output terminal of one of the preceding charge pump stages in the cascade, at which the output terminal voltage is closest to and not above said upper threshold voltage.

12. The RFID tag according to claim 8, wherein the control logic comprises a plurality of switches, each switch being arranged between the output terminal of one of the plurality of charge pump stages and a rectifier terminal.

13. The RFID tag according to claim 12, wherein the control logic is configured to close and open the plurality of switches such that the selected output terminal is connected to the rectifier output terminal.

14. The RFID tag according to claim 8, wherein
   the pair of antenna input terminals comprises a positive input terminal and a negative input terminal,
   the pair of charging terminals of each charge pump stage comprises a positive charging terminal and a negative charging terminal, and
   for any two neighboring charge pump stages in the cascade, the positive charging terminal of one of the two neighboring charge pump stages is connected to the positive input terminal, the positive charging terminal of the other one of the two neighboring charge pump stages is connected to the negative input terminal, the negative charging terminal of the one of the two neighboring charge pump stages is connected to the negative input terminal, and the negative charging terminal of the other one of the two neighboring charge pump stages is connected to the positive input terminal.

15. A method of providing and limiting a supply voltage to an RFID tag, the method comprising:
- providing a pair of antenna input terminals configured to receive an input signal from an RFID tag antenna;
- providing a plurality of charge pump stages, each charge pump stage comprising a pair of charging terminals connected to the pair of antenna input terminals, an input terminal, and an output terminal, wherein the plurality of charge pump stages are coupled in cascade in such a way that the input terminal of a first charge pump stage in the cascade is connected to ground and the input terminal of each subsequent charge pump stage in the cascade is coupled to the output terminal of the preceding charge pump stage in the cascade; and
- selecting the output terminal of one charge pump stage among the plurality of charge pump stages to provide the supply voltage.

16. The method according to claim 15, wherein the selecting step comprises selecting the output terminal of the charge pump stage among the plurality of charge pump stages at which the output terminal voltage is closest to and not above an upper threshold voltage.

17. The method according to claim 15, wherein the selecting step comprises initially selecting the output terminal of the last charge pump stage in the cascade, comparing the voltage at the initially selected output terminal with an upper threshold voltage, and if said voltage exceeds the upper threshold voltage, selecting the output terminal of one of the preceding charge pump stages in the cascade, at which the output terminal voltage is closest to and not above said upper threshold voltage.

18. The method according to claim 15, wherein the selecting step comprises operating a plurality of switches, each switch being arranged between the output terminal of one of the plurality of charge pump stages and a rectifier output terminal.

19. The method according to claim 18, wherein the selecting step comprises closing and opening the plurality of switches such that the selected output terminal is connected to the rectifier output terminal.

\* \* \* \* \*